US009800291B1

(12) United States Patent
Ben David et al.

(10) Patent No.: US 9,800,291 B1
(45) Date of Patent: Oct. 24, 2017

(54) DATA BACKUP AND CHARGING DEVICE FOR COMMUNICATION DEVICES

(71) Applicants: Lior Ben David, Yavne (IL); Chai Israeli, Yavne (IL)

(72) Inventors: Lior Ben David, Yavne (IL); Chai Israeli, Yavne (IL)

(*) Notice: Subject to any disclaimer, the term of this patent is extended or adjusted under 35 U.S.C. 154(b) by 0 days.

(21) Appl. No.: 15/428,174

(22) Filed: Feb. 9, 2017

Related U.S. Application Data

(63) Continuation of application No. 15/424,850, filed on Feb. 5, 2017.

(60) Provisional application No. 62/330,889, filed on May 3, 2016, provisional application No. 62/325,481, filed on Apr. 21, 2016.

(51) Int. Cl.
| | |
|---|---|
| *H04B 3/54* | (2006.01) |
| *H04B 1/3883* | (2015.01) |
| *H04W 12/06* | (2009.01) |
| *H04W 8/24* | (2009.01) |
| *H02J 7/02* | (2016.01) |
| *H02J 7/00* | (2006.01) |

(52) U.S. Cl.
CPC .............. *H04B 3/548* (2013.01); *H02J 7/007* (2013.01); *H02J 7/0047* (2013.01); *H02J 7/025* (2013.01); *H04B 1/3883* (2013.01); *H04W 8/24* (2013.01); *H04W 12/06* (2013.01)

(58) Field of Classification Search
CPC ..... H04B 3/548; H04B 1/3883; H02J 7/0047; H02J 7/007; H02J 7/025; H04W 8/24; H04W 12/06

USPC .......................................................... 455/557
See application file for complete search history.

(56) References Cited

U.S. PATENT DOCUMENTS

| | | | | |
|---|---|---|---|---|
| 5,138,351 | A * | 8/1992 | Wiegand ................. | G03B 7/26 320/111 |
| 6,016,045 | A * | 1/2000 | Thomas .................. | H02J 9/061 180/68.5 |
| 6,249,690 | B1 * | 6/2001 | Mashiko ................. | H02J 7/00 320/106 |
| 6,344,727 | B1 * | 2/2002 | Desai .................... | G06F 1/1632 320/107 |

(Continued)

FOREIGN PATENT DOCUMENTS

| | | |
|---|---|---|
| CN | 204441917 | 7/2015 |
| GB | 2437118 | 10/2007 |
| WO | 2015075724 | 5/2015 |

*Primary Examiner* — Hai V Nguyen
(74) *Attorney, Agent, or Firm* — Mark M. Friedman

(57) ABSTRACT

A device interfaces with a mobile communication device, for example, a smartphone or tablet, that has data stored in a memory. A device body has a data storage element integrated inside the device body. A first interface receives alternating current (AC) voltage from a mains power supply. A second interface detachably and electronically couples the mobile communication device to the data storage element. The second interface also provides direct current (DC) voltage to the mobile communication device. A data management application on the mobile communication device issues a command for the device to receive a copy of a subset of the data stored in the memory of the mobile communication device. The received copied subset of data is stored in a protected format having at least one layer of protection in the data storage element. A unique identifier associates the stored subset of data with the mobile communication device.

19 Claims, 8 Drawing Sheets

(56) References Cited

U.S. PATENT DOCUMENTS

| | | | | |
|---|---|---|---|---|
| 6,664,760 B2* | 12/2003 | Kobayashi | | H02J 7/0068 320/114 |
| 6,804,538 B2* | 10/2004 | Steinbach | | H04M 1/72502 455/412.1 |
| 6,832,107 B2* | 12/2004 | Mashiko | | H02J 7/00 320/106 |
| 7,076,270 B2* | 7/2006 | Jaggers | | H04M 1/72527 379/428.03 |
| 7,133,278 B2* | 11/2006 | Amdahl | | G06F 1/26 361/679.02 |
| 7,367,846 B1* | 5/2008 | Yang | | H01R 13/633 439/500 |
| 7,697,963 B1* | 4/2010 | Pomery | | H02J 7/0044 455/426.1 |
| 8,166,558 B2* | 4/2012 | Meijer | | G06F 21/57 276/2 |
| 8,312,660 B1* | 11/2012 | Fujisaki | | F41A 17/08 42/70.01 |
| 8,541,985 B1 | 9/2013 | Wong | | |
| 8,560,865 B2* | 10/2013 | Goel | | G06F 11/1456 710/20 |
| 8,584,243 B2* | 11/2013 | Britton | | G06F 21/56 713/188 |
| 8,584,388 B1* | 11/2013 | Fujisaki | | F41A 17/08 42/70.01 |
| 8,639,214 B1* | 1/2014 | Fujisaki | | H04M 11/007 379/88.03 |
| 8,676,273 B1* | 3/2014 | Fujisaki | | H04M 1/6505 379/142.06 |
| 8,725,924 B2* | 5/2014 | Johnson | | G06F 13/4022 710/15 |
| 8,926,520 B2* | 1/2015 | Purdy | | A61B 5/02154 600/342 |
| 8,964,406 B2* | 2/2015 | Wacker | | H01M 2/30 174/50.52 |
| 9,223,375 B1 | 12/2015 | Samorukov et al. | | |
| 9,287,022 B2* | 3/2016 | Goel | | G06F 11/1456 |
| 9,307,344 B2* | 4/2016 | Rucker | | H04W 4/005 |
| 9,385,549 B2 | 7/2016 | Miller et al. | | |
| 2001/0029190 A1* | 10/2001 | Mashiko | | H02J 7/00 455/551 |
| 2002/0119800 A1* | 8/2002 | Jaggers | | H04M 1/72527 455/556.1 |
| 2003/0074569 A1* | 4/2003 | Yamauchi | | G06F 21/10 713/189 |
| 2003/0098670 A1* | 5/2003 | Kobayashi | | H02J 7/0068 320/114 |
| 2004/0054827 A1* | 3/2004 | Liu | | G06F 3/0607 710/74 |
| 2004/0063464 A1* | 4/2004 | Akram | | H04W 52/0206 455/559 |
| 2005/0097046 A1* | 5/2005 | Singfield | | G06Q 20/042 705/42 |
| 2005/0113704 A1* | 5/2005 | Lawson | | A61B 5/00 600/513 |
| 2005/0182876 A1* | 8/2005 | Kim | | G06F 13/385 710/100 |
| 2005/0195975 A1* | 9/2005 | Kawakita | | H04L 9/0822 380/30 |
| 2006/0041778 A1* | 2/2006 | Lizzi | | G06F 13/102 714/4.1 |
| 2006/0158154 A1* | 7/2006 | Maurilus | | H04M 1/72527 320/115 |
| 2007/0096685 A1* | 5/2007 | Skogmar | | H02J 7/00 320/107 |
| 2010/0076615 A1* | 3/2010 | Daniel | | F03D 9/00 700/293 |
| 2010/0208860 A1* | 8/2010 | Petrovich | | G21C 15/00 376/347 |
| 2010/0262845 A1* | 10/2010 | Goel | | G06F 11/1456 713/300 |
| 2011/0050162 A1* | 3/2011 | Fallhowe | | H02J 7/0027 320/107 |
| 2012/0190412 A1* | 7/2012 | Buniatyan | | H04M 19/08 455/573 |
| 2013/0103582 A1* | 4/2013 | Singfield | | G06Q 20/042 705/43 |
| 2014/0024956 A1* | 1/2014 | Purdy | | A61B 5/02154 600/488 |
| 2014/0032943 A1* | 1/2014 | Goel | | G06F 11/1456 713/300 |
| 2014/0160715 A1* | 6/2014 | Wacker | | H01M 2/30 361/810 |
| 2015/0061387 A1* | 3/2015 | Daniel | | F03D 9/00 307/24 |
| 2015/0112211 A1* | 4/2015 | Purdy | | A61B 5/02154 600/486 |
| 2015/0112212 A1* | 4/2015 | Purdy | | A61B 5/02154 600/486 |
| 2015/0213659 A1* | 7/2015 | Marthinussen | | G06F 21/32 340/5.83 |
| 2015/0263554 A1 | 9/2015 | Wen | | |
| 2015/0288215 A1* | 10/2015 | Zhang | | G06F 1/3234 713/323 |
| 2016/0049816 A1 | 2/2016 | Yang | | |
| 2016/0188235 A1* | 6/2016 | Lemelev | | G06F 3/0619 711/162 |
| 2016/0217004 A1* | 7/2016 | Lin | | G06F 13/10 |
| 2016/0234368 A1* | 8/2016 | Goel | | G06F 11/1456 |
| 2016/0286100 A1* | 9/2016 | Kim | | H02J 7/0052 |

* cited by examiner

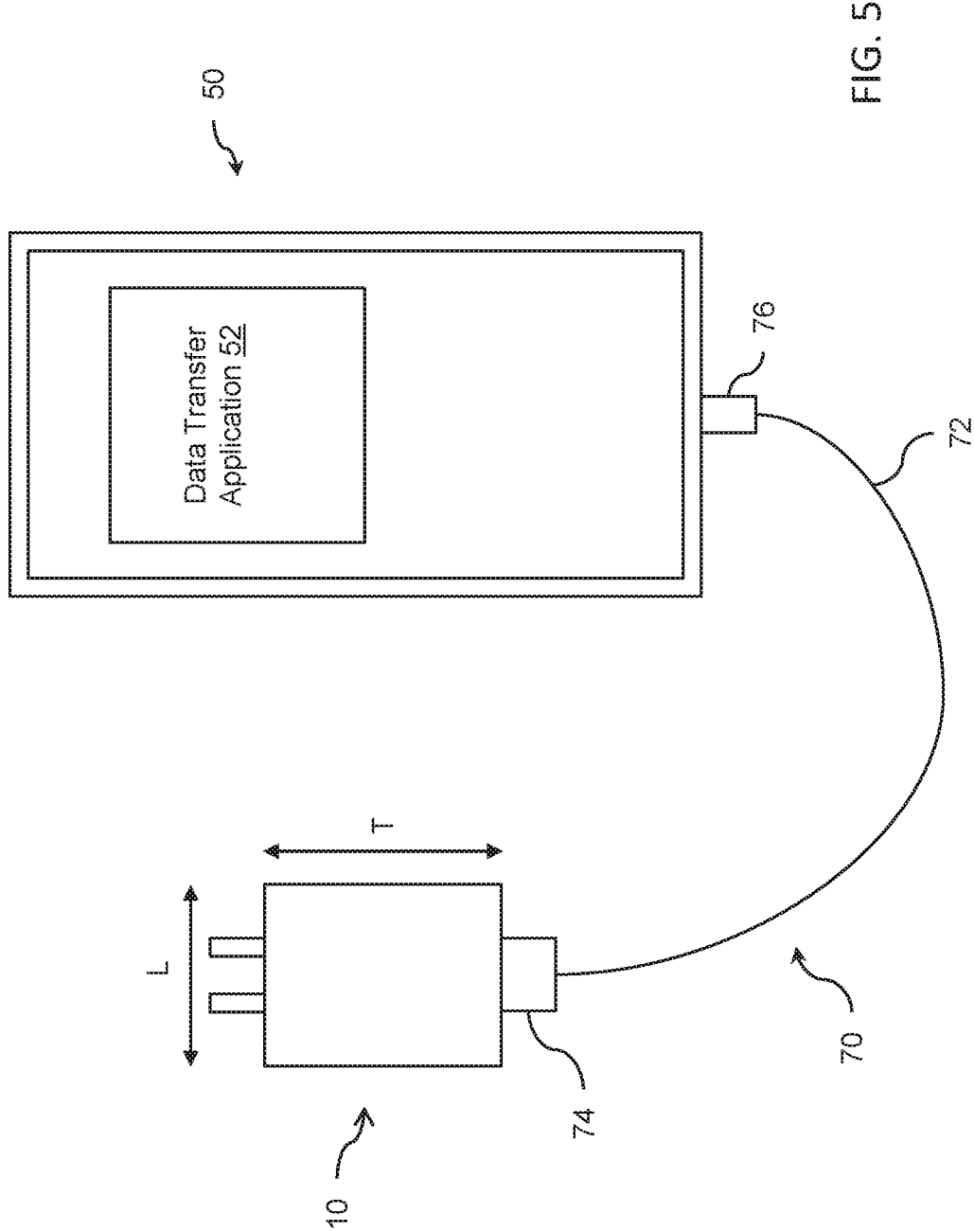

DATA BACKUP AND CHARGING DEVICE FOR COMMUNICATION DEVICES

CROSS-REFERENCE TO RELATED APPLICATIONS

This application is a continuation of U.S. patent application Ser. No. 15/424,850, filed Feb. 5, 2017. This application claims priority from U.S. Provisional Patent Application No. 62/330,889, filed May 3, 2016, and from U.S. Provisional Patent Application No. 62/325,481, filed Apr. 21, 2016, whose disclosures are incorporated by reference in their entirety herein.

TECHNICAL FIELD

The present invention relates to data backup and power chargers for mobile communication devices.

BACKGROUND OF THE INVENTION

Mobile communication devices with rechargeable batteries and data storage capabilities, such as, for example, smartphones and tablets, are used to store various forms of media and data, including, but not limited to, digital pictures, videos, music, e-mails, calendar items, and the like. The pervasive storage of data on such mobile communication devices, and the frequent upgrading and changing of mobile communication devices, are a source of motivation for users to perform data backup procedures. Such backup procedures may be performed by uploading data to a cloud server over a communication network, backing up data to a computer running specialized software for interfacing with the mobile communication device, and backing up data to external storage devices such as external hard drives or flash drives.

In addition, such mobile communication devices require frequent recharging of the rechargeable battery, typically via a cable for connecting the mobile communication device to a power source (e.g., a wall socket). As a result, many users carry charging devices on their person to ensure extended battery life. However, users that wish to recharge their devices and perform data backup simultaneously, are required to either carry separate accessories for charging and data backup, or are required to have access to a communication network for data backup purposes.

SUMMARY OF THE INVENTION

The present invention is a single device for performing data backup and recharging for a mobile communication device.

According to the teachings of an embodiment of the present invention, there is provided a device for interfacing with a mobile communication device, the mobile communication device including a storage medium having data retained thereon. The device comprises: a device body having at least one data storage element integrated therein; a first interface having at least one portion integrated within the device body, the first interface for receiving alternating current (AC) voltage from a mains power supply; and a second interface having at least one portion integrated within a footprint of the device body, the second interface operative to detachably and electronically couple the mobile communication device to the at least one storage element and the first interface, and to provide direct current (DC) voltage, converted from the received AC voltage, to the mobile communication device. The device is operative to receive a copy of a subset of the data retained on the storage medium in response to a command issued by the mobile communication device when electronically coupled to the second interface, the received copied subset of data being stored, in a protected format having at least one layer of protection, in the at least one storage element, the stored subset of data having an assigned unique identifier associating the stored subset of data with the mobile communication device.

Optionally, the at least one layer of protection includes encrypting at least a portion of the stored subset of data.

Optionally, the at least one layer of protection includes assigning a unique password to the stored subset of data.

Optionally, in response to the mobile communication device being electronically coupled to the first interface, a data management application is executed on the mobile communication device so as to provide a command interface between the device and the mobile communication device to issue the command to copy the subset of the data.

Optionally, the command is issued by the mobile communication device via the provided command interface.

Optionally, the data management application is installed on the mobile device prior to a first electronic coupling of the mobile communication device to the first interface.

Optionally, the storing of the subset of data defines a storage event associating the device and the mobile communication device, and wherein, in response to electronic coupling of the mobile communication device to the first interface prior to the occurrence of any storage events, the copied subset of the data includes substantially the entirety of the data retained on the storage medium, and the unique identifier is assigned based on an identification number of the mobile communication device.

Optionally, in response to electronic coupling of the mobile communication device to the first interface subsequent to the occurrence of at least one storage event, the copied subset of the data includes a subset of the data retained on the storage medium not stored on the at least one data storage element as a result of a preceding electronic coupling of the mobile communication device to the first interface.

Optionally, in response to a command issued by a second mobile communication device electronically coupled to the first interface, the stored subset of data of the mobile communication device is copied to a storage medium of the second mobile communication device.

Optionally, the first interface includes an AC power plug deployed on a surface of the device body in a fixed extending position away from the device body.

Optionally, the device further comprises: at least one rechargeable power supply integrated within the device body, the second interface being switchably coupled to the first interface and the at least one rechargeable power supply.

Optionally, the at least one rechargeable power supply is operative to receive DC voltage converted from the received AC voltage, and to provide DC voltage to the second interface.

Optionally, the device further comprises: a power controller electronically coupled to the rechargeable power supply, the first interface, and the second interface, the power controller integrated within the device body and operative to switch between a first state, in which DC voltage converted from the received AC voltage is provided to at least one of the second interface and the rechargeable power supply, and a second state, in which DC voltage stored in the rechargeable power supply is provided to the second interface.

Optionally, the at least one data storage element receives operational power from at least one power source selected from the group consisting of: the mobile communication device, the rechargeable power supply, and AC voltage received via the first interface.

Optionally, the device further comprises: at least one status indicator formed on a surface of the device body, the at least one status indicator providing an indication of at least one of: a charge status of the rechargeable power supply, a backup status of the subset of the data copied to the at least one storage element, and a charge status of a rechargeable power supply of the mobile communication device Optionally, the second interface includes a female universal serial bus (USB) interface having a portion thereof exposed on a surface of the device body, the female USB interface for receiving a male USB connector.

Optionally, the device body includes a length dimension, a width dimension, and a thickness dimension, and at least a portion of the first interface is formed on a first surface in a plane defined by the length and width dimensions, and at least a portion of the second interface is formed on a second surface oppositely disposed from the first surface.

Optionally, the thickness dimension is substantially larger than each of the length and width dimensions.

Optionally, the length and width dimensions are substantially equal.

There is also provided according to an embodiment of the teachings of the present invention, a data backup system. The system comprises: a device for interfacing with a mobile communication device including a storage medium having data stored thereon, the device comprising: at least one storage element, a first interface to receive alternating current (AC) voltage from a mains power supply, and a second interface to provide a data link between the at least one storage element and the mobile communication device, and to provide direct current (DC) voltage, converted from the received AC voltage, to the mobile communication device; and a data management application executable on the mobile communication upon establishing the data link between the at least one storage element and the mobile communication device, the data management application providing an interface to automatically backup a subset of the data of the storage medium on the at least one storage element.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 5 is a top view illustrating a schematic representation of the device connected to a mobile communication device having a command interface displayed thereon, according to the teachings of an embodiment of the present invention.

DESCRIPTION OF THE PREFERRED EMBODIMENTS

Figure 2:
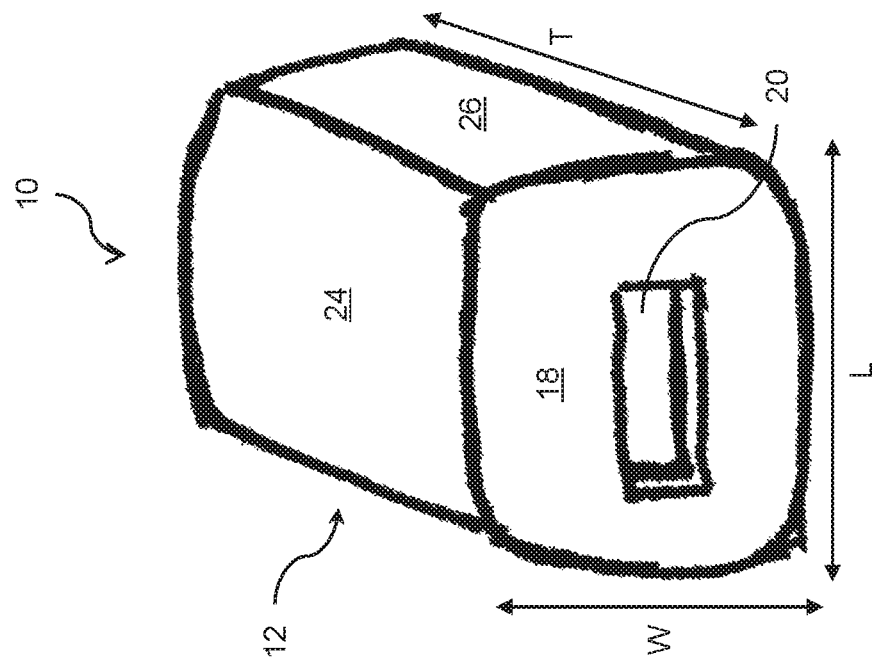
FIG. 2 is an isometric view of the device taken from the rear of the device, according to the teachings of an embodiment of the present invention.

The present invention is a single device for performing data backup and recharging for a mobile communication device.

Within the context of this document, the terms "mobile communication device" and "mobile device" are used interchangeably. These terms generally refer to any device that can be used for sending, receiving, and storing data. A non-exhaustive list of mobile communication devices includes, but is not limited to, smartphones, tablets, cellular phones, laptop computers, electronic readers, and desktop computers.

The principles and operation of the device according to the present invention may be better understood with reference to the drawings and accompanying description.

The present invention is applicable for use with any mobile communication device, and is of particular value when used with light-weight portable mobile communication devices, such as smartphones and tablets.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways. Initially, throughout this document, references are made to directions such as, for example, front and rear, top and bottom, and the like. These directional references are exemplary only to illustrate the invention and embodiments thereof.

Referring now to the drawings, FIGS. 1-3 and 5 show various views of a device, generally designated 10, for interfacing with a mobile communication device 50 having a rechargeable power supply and a data storage medium (i.e., memory), to perform data backup and recharging of the mobile communication device 50. Generally speaking, the device 10 includes a device body 12, an alternating current (AC) input interface 16, an output interface 20, and electronics 30 fully integrated within the device body 12. The electronics 30 perform data backup and recharging functions, as will be discussed in more detail below with reference to FIG. 4 and FIGS. 6A-6D.

The interfacing between the device 10 and the mobile communication device 50 is typically effectuated by a connector assembly 70. The connector assembly 70 includes, a first connector 74 for interfacing with the output interface 20, a second connector 76 for interfacing with a port of the mobile communication device 50, and a main body 72, typically implemented as a cable to which the connectors 74, 76 are attached at opposite ends.

The device body 12 is preferably constructed from a waterproof and non-flammable material, such as, for example, fire-safe polymers. The device body 12 has a length (L), a width (W) and a thickness (T) dimension. In a non-limiting construction of the device body 12, the device body 12 is formed of multiple surfaces, including a front surface 14, a rear surface 18, a first side surface 22, a second side surface 26, a top surface 24, and a bottom surface 28. The front surface 14 and the rear surface 18 are oppositely disposed from each other in separate planes defined by the L and W dimensions, and are separated by a distance defined by the T dimension. Similarly, the top surface 24 and the bottom surface 28 are oppositely disposed from each other in separate planes defined by the L and T dimensions, and are separated by a distance defined by the W dimension. Similarly, the side surfaces 22 and 26 are oppositely disposed from each other in separate planes defined by the W and T dimensions, and are separated by a distance defined by the L dimension.

Note that the side surfaces 22 and 26, the top surface 24 and the bottom surface 28 may be forged from a single body so as to create a single integrally formed surface with an internal cavity, closed-off by the front surface 14 and rear surface 18. The connections between the surfaces of the device body 12 are preferably made permanent, such that the internal cavity of the device body 12 can only be accessed by the user of the device 10 by damaging the surfaces of the device body 12. The integrated positioning of the electronics 30 within the device body, coupled with waterproof and non-flammability of the device body 12, vastly increases the resistance of the device 12 to damage from water (and other liquids) and fire.

As should be apparent from the above description of the non-limiting construction of the device body 12, the shape of the device body 12 is generally polygonal, such as that of a square or rectangle, in the plane defined by the L and W dimensions, and is generally square or rectangular in the plane defined by the W and T dimensions. As such, the L and W dimensions of the device body 12 may each be less than the T dimension, and the L and W dimensions of the device body 12 may be approximately equal to each other.

Preferably, the L, W, and T dimensions are each less than 4 centimeters (cm). More preferably, the L dimension is in a range of 2-3 cm, the W dimension is in a range of 2-3 cm, and the T dimension is in a range of 2.5-3.5 cm.

Note that each of the above-mentioned surfaces may be formed of more than one surface, resulting in polygonal shapes of more than four sides, such as, for example, pentagonal or hexagonal shapes.

The alternating current (AC) input interface 16 is positioned on one of the surfaces of the device body 12, and receives AC voltage from a mains voltage power supply by interfacing with, for example, a wall outlet, so as to come into operative cooperation with the mains voltage power supply. A mains voltage power in the United States typically supplies power in the range of 100-120 volts AC, while a mains voltage power supply in Europe typically supplies power in the range of 220-240 volts AC. Voltage adapters may be used to interface the AC plug with wall sockets for which the AC plug is not configured for insertion. For example, when the AC plug is suited for insertion into a wall socket connected to a United States mains voltage power supply, a voltage adapter may be used to interface the AC plug with a European mains voltage power supply.

Figure 1:
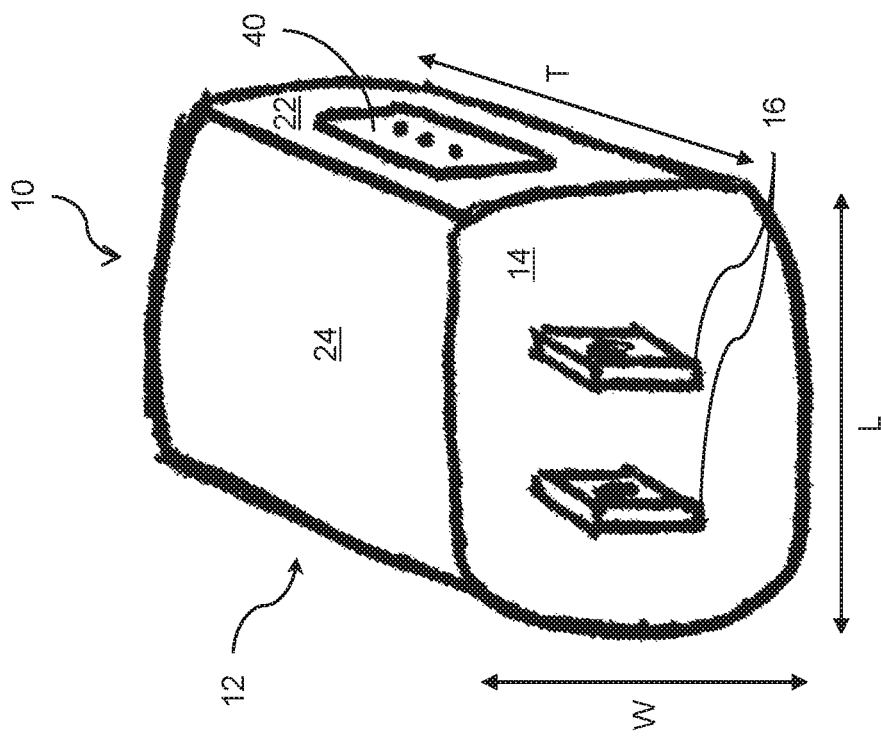
FIG. 1 is an isometric view of a device for performing data backup and charging of a communication device, taken from the front of the device, according to the teachings of an embodiment of the present invention.
Figure 3:
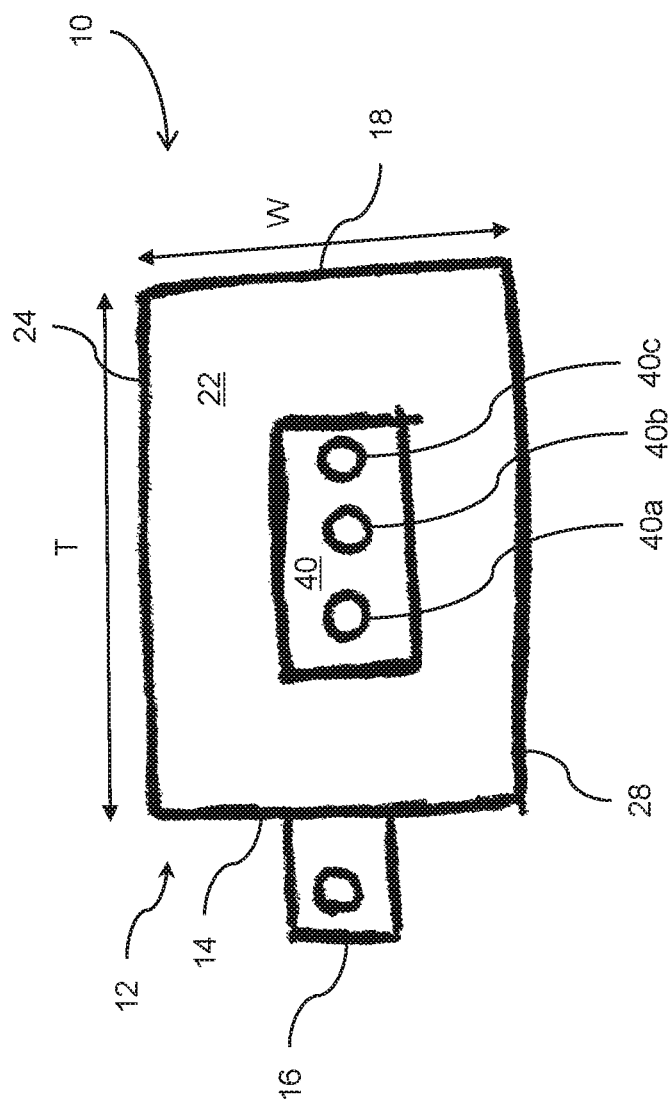
FIG. 3 is a side view of the device showing a status indicator on a surface of the device, according to the teachings of an embodiment of the present invention.
Figure 4:
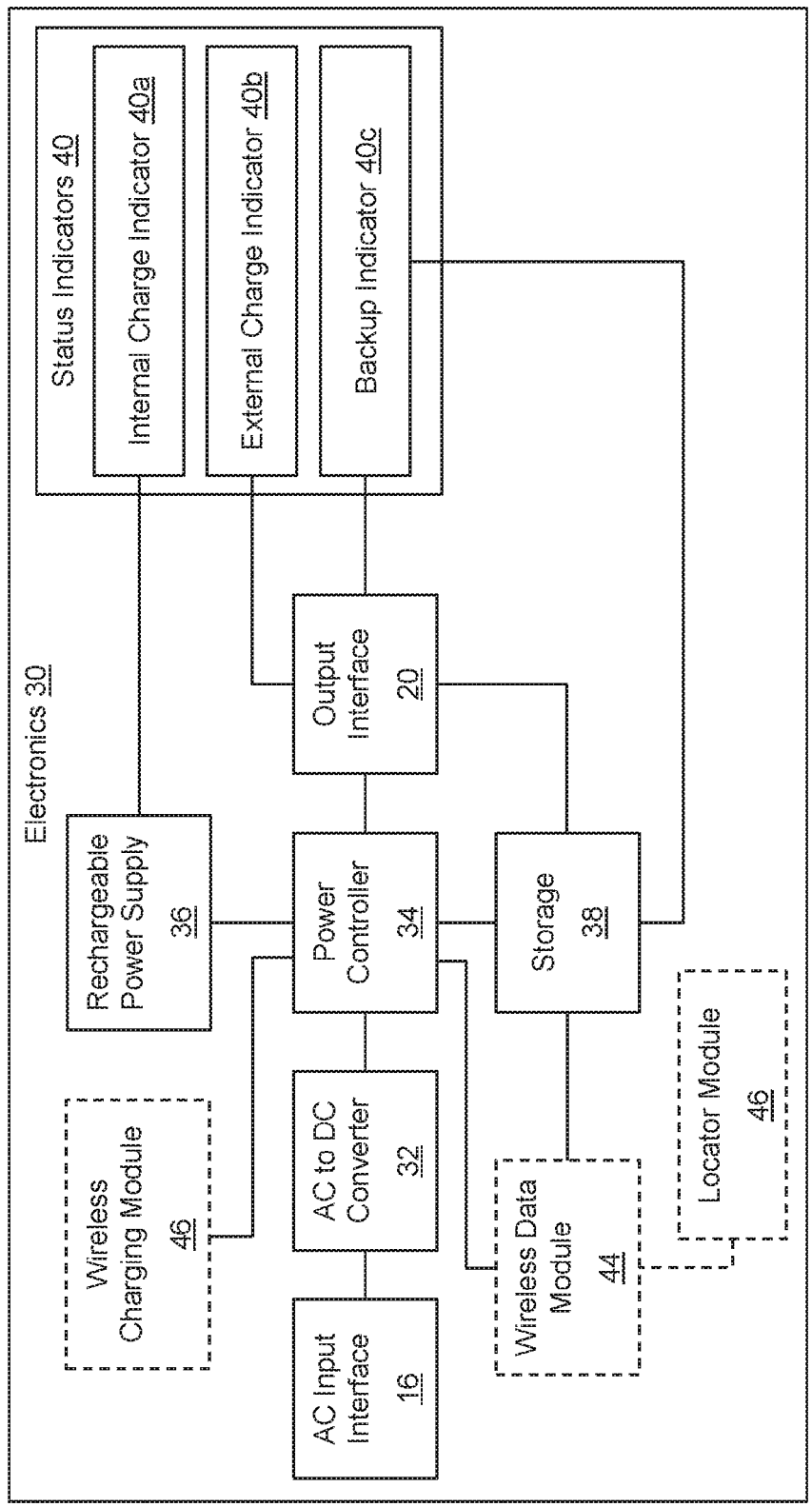
FIG. 4 is a block diagram of components of the device integrated within the body of the device, according to the teachings of an embodiment of the present invention.

The AC input interface 16 is preferably implemented as an AC plug, depicted schematically in FIGS. 1-3 and 5, and depicted as an electronic component block in FIG. 4. The prongs of the AC plug are electrically coupled to components of the electronics 30, as will be discussed in further detail below. In a non-limiting construction of the device 10, as shown in FIGS. 1, 3 and 5, the prongs of the AC plug are preferably integrated on the front surface 14 of the device body 12. Accordingly, a first portion of the AC input interface 16, namely the prong ends, is deployed in a position external from the device body 12 and exposed to the environment, and a second portion of the AC input interface 16 is retained within the device body 12.

When implemented as an AC plug, the AC input interface 16 may be in a fixed extended position away from the device body 12, as shown in FIGS. 1, 3 and 5. Alternatively, the AC input interface 16 may be moveable between an extended position (FIGS. 1, 3 and 5) and a retracted position (not shown) in which the prong ends of the AC plug are approximately flush with the front surface 14.

The output interface 20 is positioned on one of the surfaces of the device body 12, and provides an interface to the mobile communication device 50. The output interface 20 is preferably implemented as an output port, depicted schematically in FIG. 2, and depicted as an electronic component block in FIG. 4. Leads of the output port are electrically coupled to components of the electronics 30, as will be discussed in further detail below. In a non-limiting construction of the device 10, as shown in FIG. 2, the output port is preferably integrated in a footprint of the rear surface 18 of the device body 12. Accordingly, part of the output interface 20 is exposed to the environment external to the device body 12, and part of the output interface 20 is retained within the device body 12.

Although the output interface 20 is preferably integrated within the rearm surface 18, the output interface 20 may be integrated within any other surface of the device body 12, including the first side surface 22, the second side surface 26, the top surface 24, the bottom surface 28, or the front surface 14 on which the AC input interface 16 is integrated.

It is noted herein that most common mobile communication devices employ cables for charging and transferring data which have a male universal serial bus (USB) type A plug on one end of the cable. Therefore, according to certain non-limiting implementations, the output interface 20 is implemented as a USB female type A port for receiving a male USB type A plug. In such a non-limiting implementation, the first connector 74 is implemented as a male USB type A plug.

Each of the AC input interface 16 and output interface 20 are coupled to respective components of the electronics 30 in order to provide a flow of electric charge between the device 10 and the mobile communication device 50. In addition, the output interface 20 is coupled to components of the electronics 30 in order to provide a data link between the storage element 38 and the mobile communication device 50. The details of the electronics 30 and the coupling of the AC input interface 16 and output interface 20 thereto will now be discussed.

Refer now to FIG. 4, a non-limiting exemplary block diagram of the electronics 30 of the device 10. The individual components of the electronics 30 include the AC input interface 16, an AC to direct current (DC) converter 32, a power controller 34, a rechargeable power supply 36, a storage element 38, the output interface 20, and a bank of status indicators 40. The electronics 30 also include a printed circuit board (PCB, not shown) to which each of the above-mentioned components of the electronics 30 is connected. The PCB provides an electrical connection between the pins (i.e., connection points) of the individual components of the electronics 30. The PCB and the individual components of the electronics 30, with the exception of the above mentioned exposed portions of the AC input interface 16 and the output interface 20, are fully integrated within the device body 12. Accordingly, the fully integrated PCB and individual components are inaccessible to, and non-removable by, the user of the device 10.

The rechargeable power supply 36 may be implemented as one or more rechargeable batteries deployed to retain, and supply, DC voltage. The rechargeable power supply 36 preferably has a capacity in the range of 2500-3500 milli-ampere hours (mAh), and more preferably a capacity of approximately 3200 mAh. The output DC voltage supplied by the rechargeable power supply is preferably approximately 5 volts DC.

The AC input interface 16 is electrically connected to the AC to DC converter 32 for converting AC voltage into DC voltage. The AC voltage received from the mains power supply, when the AC input interface 16 is interfaced with the mains power supply, is converted to DC voltage by the AC to DC converter 32.

The DC voltage from the AC to DC converter 32, preferably approximately 5 volts DC, is supplied, either directly or indirectly, to various other components of the electronics 30. The power controller 34, connected to the AC to DC Converter 32, controls the flow of electric charge to the various other components of the electronics 30. For example, when the AC input interface 16 is interfaced with the mains power supply (e.g., when the AC plug is inserted into a wall socket), the power controller 34 provides the converted DC voltage from the AC to DC converter 32 to the rechargeable power supply 36 for recharging the rechargeable power supply 36. The control of flow of electric charge may be accomplished by a current sensor which may be interconnected between the AC to DC converter 32 and the power controller 34, or incorporated as a subcomponent of the power controller 34.

The output interface 20 is connected to the storage element 38 and the power controller 34. The power controller 34 provides a flow of DC voltage, either from the AC to DC converter 32 or DC voltage stored in the rechargeable power supply 36, to the output interface 20. The DC voltage is then provided to the mobile communication device 50 from the output interface 20 via the connector assembly 70.

The device 10 mainly operates in two power modes when interfaced with the mobile communication device 50, as will now be described. In a first power mode, the AC input interface 16 is interfaced with the mains power supply for receiving AC voltage. The received input AC voltage flows to the AC to DC converter 32, which converts the received AC voltage into DC voltage and provides that DC voltage to the power controller 34. Based on input from a charge sensing component, such as, for example, a current sensor, the power controller 34 provides the DC voltage to the rechargeable power supply 36 and to the output interface 20. In this way, the device 10 can simultaneously provide DC voltage to the mobile communication device 50 for recharging, and recharge the internal rechargeable power supply 36 of the device 10. In addition, the storage element 38 may receive operational power from the AC to DC converter 32, which may be provided directly to the storage element 38 by the AC to DC converter 32 or indirectly via the power controller 34.

In a second power mode, the AC input interface 16 is disengaged from the mains power supply, and no AC voltage is provided to the device 10. Based on input, or lack thereof, from a charge sensing component, such as, for example, a current sensor, the power controller 34 receives stored DC voltage from the rechargeable power supply 36 and provides the DC voltage to the output interface 20. The storage element 38 may receive operational power from the rechargeable power supply 36, which may be provided directly to the storage element 38 by the rechargeable power supply 36 or indirectly via the power controller 34.

As discussed above, the power controller 34 controls the flow of electric charge to the various other components of the electronics 30. According to certain non-limiting embodiments of the device 10 and non-limiting implementations of the power controller 34, the power controller 34 may include an electronic switching arrangement, or a switching matrix, for effectuating the above described flow of electric charge between components of the electronics 30.

As noted above, the output interface 20 provides an interface for establishing a data link, for example via the connector assembly 70, between the storage element 38 and the mobile communication device 50. As such, the storage element 38 is configured to receive copies of data stored on a memory of the mobile communication device 50, and store the copied data as backup data. The storage element 38 may be implemented as one or more readable and/or writeable data storage device, and is preferably implemented as one or more electronic solid-state non-volatile computer storage mediums, such as a flash memory. The storage capacity of the storage element 38 is preferably large enough in order to perform effective data backup for common mobile communication devices. A non-limiting and non-exhaustive list of exemplary storage capacities include 16 gigabyte (GB), 32 GB, 64 GB, 128 GB and 256 GB. The data stored on the storage element 38 may be compressed in order to save disk space, or may be stored in a non-compressed form.

As will be discussed in more detail below, the backup data stored on the storage element 38 is stored in a multi-layered protected format, via encryption and password protection, and has an assigned identifier associating the backup data with the mobile communication device from which the backup data was copied. Each time the device 10 performs a data backup for the mobile communication device 50, a data storage event associated with the backup data is generated and stored on the storage element 38, and optionally on a memory of the mobile communication device 50.

Returning now to FIGS. 1 and 3, the bank of status indicators 40 preferably includes multiple indicators with the rechargeable power supply 36, the storage element 38, and the output interface 20 being electrically connected, in some combination, to the individual indicators. In FIGS. 1 and 3, the status indicators 40 are depicted schematically as an indicator panel formed on one of the surfaces of the device body, which in a non-limiting construction of the device 10 is shown in FIGS. 1 and 3 as the first side surface 22.

With continued reference to FIG. 4, the bank of status indicators 40 includes an internal charge indicator 40a, an external charge indicator 40b, and a backup indicator 40c. The internal charge indicator is electrically connected to the rechargeable power supply 36 to provide a charge status of the rechargeable power supply 36. The external charge indicator 40b is electrically connected to the output interface 20 to provide a charge status of the rechargeable power supply of the mobile communication device 50 when the mobile communication device 50 is interfaced with the device 10. The backup indicator 40c is electrically connected to either or both of the output interface 20 and storage element 38 to provide a data backup status when the device 10 performs data backup functionality.

The individual indicators may be implemented as multi-state indicators operable in multiple states. For example, a first state of operation of the internal charge indicator 40a may indicate that the rechargeable power supply 36 is being charged, a second state of operation of the internal charge indicator 40a may indicate that the rechargeable power supply 36 is providing charge to the mobile communication device 50, and a third state of operation of the internal charge indicator 40a may indicate that the rechargeable power supply 36 is not being charged.

Preferably, each of the individual indicators is implemented as one or more LEDs. Further to the above-mentioned example multi-state operation of the internal charge indicator 40a example, the first state may be indicated by illumination of a first LED (e.g., a red LED), the second state may be indicated by illumination of a second LED (e.g., a green LED), and the third may be indicated by not illuminating any LEDs.

Multi-state indicators, such as one or more LEDs, may be used for the external charge indicator 40b and the backup indicator 40c, similar to as discussed above with reference to the internal charge indicator 40a.

Alternatively, the internal charge indicator 40a may be implemented as a series of LEDs, which when illuminated in certain combinations provide an indication as to the charge retained in the rechargeable power supply 36. For example, a series of five LEDs may be used in such an implementation. Illumination of all five LEDs indicates a charge of 100% of the rechargeable power supply 36, illumination of four LEDs indicates a charge in the range of 80%-99% of the rechargeable power supply 36, illumination of three LEDs indicates a charge in the range of 60%-79% of the rechargeable power supply 36, illumination of two LEDs indicates a charge in the range of 40%-59% of the rechargeable power supply 36, illumination of one LED indicates a charge in the range of 20%-39% of the rechargeable power supply 36, and the lack of illumination of the LEDs indicates a charge of less than 20% of the rechargeable power supply 36.

The electronics 30 may optionally include a locator module 42 for periodically emitting location information for receipt by the user of the mobile communication device 50. The locator module 42 allows the user of the mobile communication device 50 to locate the device 10 in cases of misplacement or theft. The locator module 42 may include a wireless transmitter that emits a signal that includes location information. The wireless transmitter may be implemented according to any wireless communication standard protocol, such as, for example, the IEEE 802.15.1 ("Bluetooth") protocol and the IEEE 802.11 ("Wi-Fi") protocol.

As mentioned above, in addition to providing recharging functionality to mobile communication devices and having a rechargeable power supply integrated within the device body 12, the device 10 also performs data backup functionality. In order to perform the data backup functionality, the device 10 is recognized by the mobile communication device 50 as an external memory device, such as an external hard drive or flash drive. In certain preferred embodiments, the device 10 is recognized by the mobile communication device 50 as a slave device, with the mobile communication device 50 being the master device. Further to this preferred master-slave configuration, the device 10 preferably does not include any processing hardware or circuitry for providing data backup functionality, and relies receiving instructions from the processing hardware and circuitry of the mobile communication device 50 to perform data backup.

The data backup functionality allows the storage element 38 to store copies of the data retained on the storage medium of the mobile communication device 50. Note that the device 10 may still perform data backup in situations where the AC input interface 16 is disengaged from the mains power supply and the rechargeable power supply 36 is of insufficient charge to provide operational power to the storage element 38. In such situations, the storage element 38 may receive operational power from the mobile communication device 50, via the output interface 20, thereby allowing the device 10 to perform data backup functionality.

Note that the device 10 may be operable to interface with multiple mobile communication devices and perform the recharging and data backup functionality for each interfaced mobile communication device.

With continued reference to FIG. 5, the data backup is performed by running (i.e., executing) a data management application 52 on the mobile communication device 50 when the mobile communication device 50 is interfaced with the device 10. The data management application 52 operates as a command and communication interface between the device 10 and the mobile communication device 50, and allows one or more processors of the mobile communication device 50 to interact with the storage element 38, via the data link provided by the output interface 20. The combination of the device 10 in operation with the data management application 52 constitutes a data backup system.

The data management application 52 may be implemented as a plurality of software instructions or computer readable program code executed on one or more processors of the mobile communication device 50. The data management application 52 may be pre-installed, via download, on the mobile communication device 50 prior to a first interfacing of the mobile communication device 50 with the device 10, or may be installed and subsequently executed upon a first interfacing of the mobile communication device 50 with the device 10. Note that the data management application 52 may be executed when the mobile communication device 50 is disconnected from the device 10, and is preferably automatically executed upon connecting the mobile communication device 50 with the device 10.

Attention is now directed to FIGS. 6A-6D which show flow diagrams detailing a process for performing data backup of a mobile communicating device. The types of data items of the mobile communication device that are stored (i.e., backed up) on the storage element 38 of the device 10 include, but are not limited to, digital pictures, videos, music, personal contacts, calendar items, email items, email attachments, and messages/data from network based messaging services and applications, such as, for example, short message service (SMS), multimedia messaging service (MMS), and WhatsApp Messenger). Throughout the remainder of this document, the types of data items which are backed up by the device 10 are referred to, as a whole, as "personal data", so as to differentiate these types of data items from configuration and setting data items stored in mobile device memory, which are typically specific to the type of mobile device. As such, the personal data is a subset of the total data stored on the mobile communication device.

It is noted that the functional steps of the process 600 involving backup of data, memory checking, memory allocation, and backup data transferring, are performed via commands received from the data management application 52.

In general, two types of data backup are discussed hereinbelow with respect to the process 600. The backup indicator 40c may be actuated differently for each of the different types of data backup being performed. For example, when the backup indicator 40c is implemented as multiple LEDs, a first LED illumination may correspond to data backup of the first type, and a second separate LED illumination may correspond to data backup of the second type.

The first type of data backup is incremental data backup, in which a full backup is performed once (or at infrequent intervals) and serves as a reference point for an incremental backup set. After a full backup, incremental backups are made after successive time periods. Each incremental backup copies data items that have been created or changed since the most recent backup of any type (i.e., either full backup or incremental backup). Within the context of this document, the term "incremental" when applied to data backup can also refer to other comparator backup techniques, including, but not limited to, differential backup.

The second type of data backup is a scheduled data backup. The scheduled data backup may copy data items that have been created or changed over a predefined time period. The scheduled data backup may be defined by a repetition rate and execution time. For example, the scheduled data backup may be defined as a weekly backup occurring every Monday at 8 PM (i.e., weekly repetition rate, and execution time of Monday at 8 PM). In this example, each scheduled backup copies data items that have been created or changed from the last scheduled backup. Alternatively, the scheduled data backup may be configured to perform a full backup at the defined repetition rate and execution time.

Figure 6A:
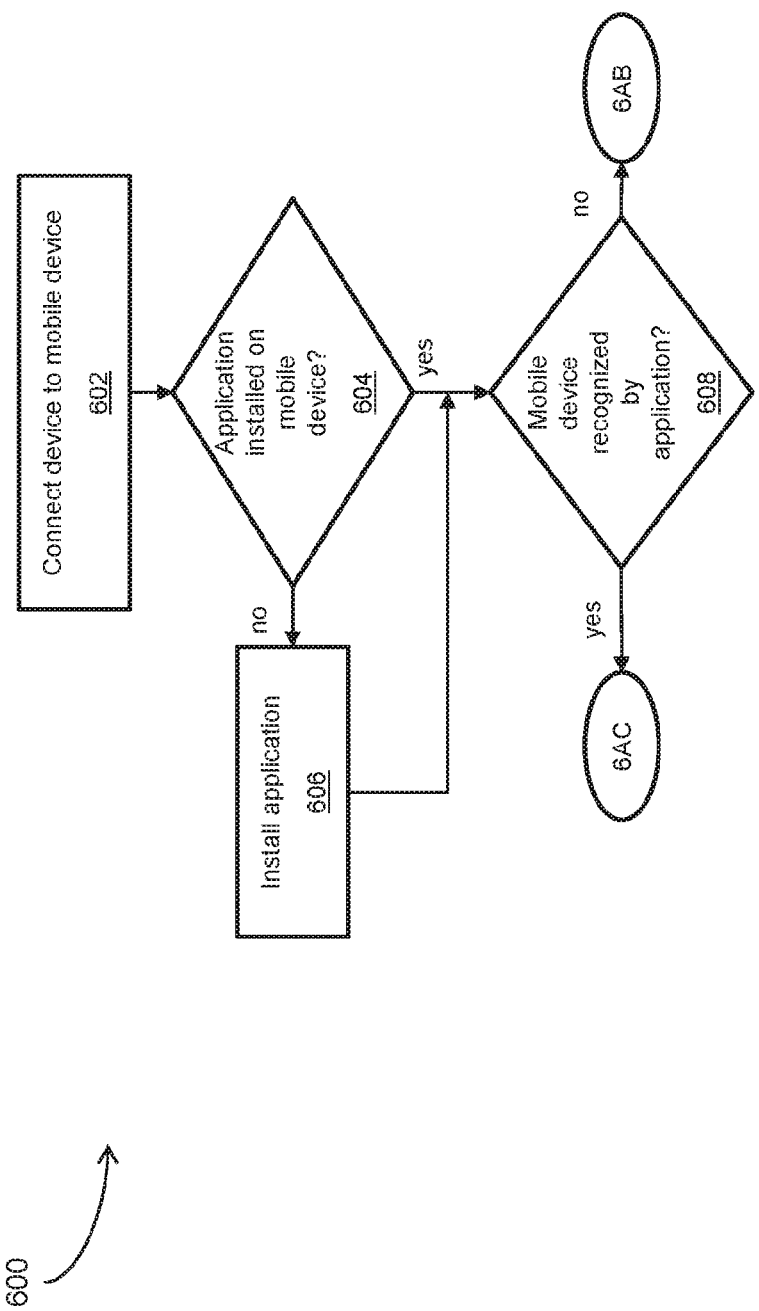
FIGS. 6A-6D are flow diagrams illustrating a process for performing data backup, according to the teachings of an embodiment of the present invention.
Figure 6B:
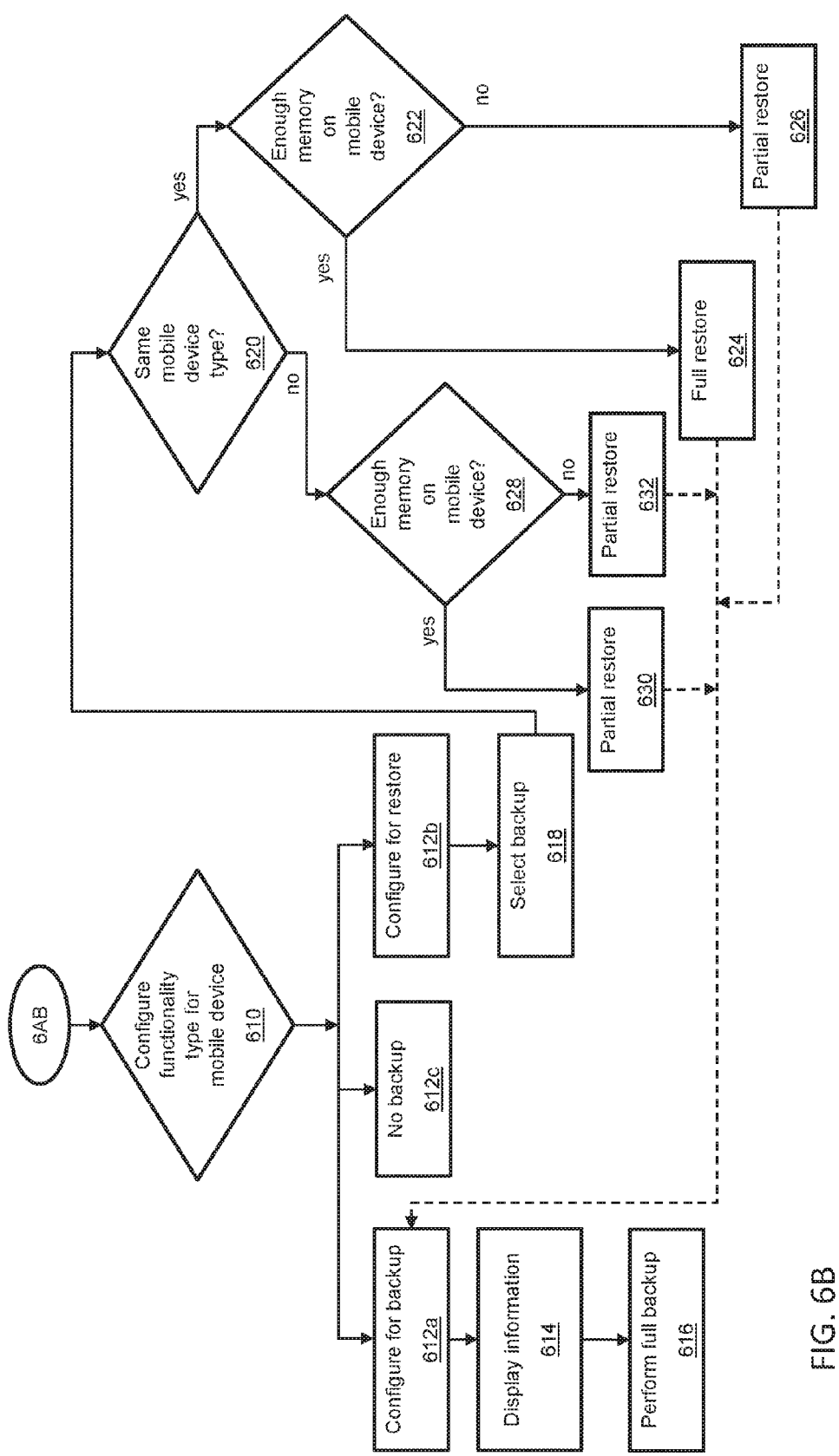

Referring now to FIG. 6A, the process 600 begins at block 602, in which a mobile communication device (hereinafter referred to as mobile device A), operative in accordance with the description of the mobile communication device 50, is interfaced, via, for example, the connector assembly 70, with the device 10. As a result of the interfacing between the device 10 and mobile device A, the process moves to block 604 where mobile device A is queried for the presence of the data management application 52. If the data management application 52 is installed on mobile device A, the data management application 52 is launched (i.e., executed) and the process 600 moves to block 608. If the data management application 52 is not installed on mobile device A, the process 600 moves to block 606, where the data management application 52 is installed (e.g., manually downloaded by the user and deployed), and subsequently moves to block 608.

In block 608, the data management application 52 reviews management data to determine if mobile device A is a recognized mobile device. In other words, the data management application 52 checks for the presence of identifiers of mobile device A. If mobile device A is recognized by the data management application 52, the process 600 moves to block 634 where steps for data backup are executed, as will be discussed with reference to FIG. 6C in further detail below.

If mobile device A is not recognized by the data management application 52, the process 600 moves to block 610 (FIG. 6B), where the user of mobile device A configures the device 10 for current and future operation with mobile device A. Movement to block 610 is applicable to various situations. For example, movement to block 610 is applicable to situations in which a user may have an existing mobile communication device (e.g., an iPhone 5 from Apple of Cupertino, Calif.) and use the device 10 to backup data stored on the existing mobile communication device. At a later point in time, the same user may obtain a different (i.e., new) mobile communication device (e.g., an iPhone 6 from Apple of Cupertino, Calif.) and wishes to transfer some or all of the backup data of the iPhone 5 stored on the device 10 onto the new mobile communication device. Movement to block 610 is also applicable to situations, for example, in which a user acquires a new backup and charging device (operative in accordance with the description of the device 10) which has never been paired with mobile device A.

In block 610 the data management application 52 generally provides three configuration types if mobile device A is not recognized by the data management application 52. The user of mobile device A may select the configuration type according to personal preference, and change the configuration type at a later time via the data management application 52.

In block 612a the first configuration type is selected. The first configuration type is configuration for data backup, in which the device 10 is configured to operate with mobile device A as a backup data device. In this configuration, initial data backup parameters are configured. The backup parameters include unique identification information pertaining to mobile device A, which is used to associate mobile device A with the device 10. The unique identification information, in the form of a unique identifier or identifiers, is logged by the data management application 52. All data from mobile device A that is backed up on the device 10 is tagged with the unique identifier, thereby associating the backup data on the device 10 with the mobile device from which the backup data was copied (e.g., mobile device A). The unique identifier is also used for determining if mobile device A is recognized by the data management application 52 in block 608.

The unique identifier includes information derived from mobile communication device A, and is preferably based on a unique identification number associated with individual mobile communication devices, such as, for example, International Mobile Subscriber Identity (IMSI), International Mobile Equipment Identity (IMEI), and Mobile Equipment Identifier (MEID).

In addition, the backup parameters include data protection information, which includes password information and may also include data encryption settings. The user of mobile device A is preferably prompted to create a password for all backup data from mobile device A stored on the device 10.

The password may be entered via an alphanumeric keypad of mobile device A. Accessing and/or copying of data stored on the storage element 38 cannot be executed without proper password authentication. As such, the proper password provides users with the authority to move and copy data from the device 10 to other mobile communication devices, or other devices operative in accordance with the description of the device 10, as will be explained in more detail below.

The data encryption settings may be configured by the user of mobile device A to select an encryption type, such as, for example, a Data Encryption Standard (DES) algorithm, Triple DES, Advanced Encryption Standard (AES), and the like. The user defined password may also be used to encrypt/decrypt the encryption/decryption key used for encrypting and decrypting the backup data.

The backup parameters may also include backup scheduling for scheduled data backup, which will be discussed in more detail below with reference to FIG. 6C.

Subsequent to block 612a, the process moves to block 614, where information is displayed, via the display screen of mobile device A. For example, the information displayed by execution of block 614 may include, but is not limited to, a listing of the mobile communication devices having data backed up on the device 10, the phone numbers of those mobile communication devices, the storage capacity of the storage element 38, the amount of used storage space on the storage element 38, the amount of available storage space on the storage element 38, and the recommended amount of required storage space for backing up mobile device A based on the type of mobile communication device.

The process 600 then moves to block 616 in which a full data backup is executed. The full data backup may include configuration and setting data of mobile device A in addition to the personal data discussed above. The backup data is encrypted, according to encryption techniques/algorithms, for example, disk encryption techniques, such that at least a portion of each data item that is backed up is encrypted. As such, unauthorized attempts to extract data from the storage element 38 are prevented, securing the device 10 in the event of theft or loss. Also, as noted above, the backup data is password protected by the user password created in block 612a, and can be used to encrypt/decrypt the encryption/decryption key used for encrypting and decrypting the backup data.

As discussed above, the backup data is also assigned a unique identifier, preferably based on a unique identification number associated with individual mobile communication devices, such as, for example, International Mobile Subscriber Identity (IMSI), International Mobile Equipment Identity (IMEI), and Mobile Equipment Identifier (MEID). The unique identifier may also include temporal information related to the storage event, such as, for example, a timestamp of the generation of the storage event.

Note that upon execution of block 616, the data management application 52 may notify the user of mobile device A of the expected time required to complete the full backup. As mentioned above, upon execution of block 616 the backup indicator 40c may also be actuated to notify the user of mobile device A that a data backup is being performed.

In addition, the data management application 52 may interrogate the rechargeable power supply 36 to determine if the rechargeable power supply 36 holds enough charge to complete the full backup without plugging the AC input interface 16 into a wall socket, or if mobile device A holds enough charge to complete the full backup without being recharged. The data management application 52 may display to the user a recommendation of whether or not plug the device 10 into a wall socket, or the recommendation may be communicated to the user via the internal charge indicator 40a or external charge indicator 40b.

Returning to block 610, the process 600 may move to block 612b in which the second configuration type is selected. The second configuration type is configuration for restoring from a backup stored on the device 10. Movement to block 612b is applicable to situations, for example, in which a user acquires a new mobile communication device and wishes to restore data from an older mobile communication device onto the newly acquired mobile communication device.

Similar to as described with reference to block 614, a listing of the mobile communication devices having data backed up on the device 10 may be displayed to the user of mobile device A. This listing includes the types (i.e., make and model) of mobile communication devices having data backed up on the device 10, as well as the amount of memory occupied by each of those backups. For example, if two mobile communication devices have data backed up on the device 10, the listing may include information pertaining to those two mobile communication devices. For example, the two mobile communication devices may be: 1) an iPhone 6 occupying 58 GB of memory; and 2) a Nexus 6 (from Motorola) occupying 60 GB of memory.

The process 600 then moves to block 618, where the user of mobile device A selects from which of the backups to restore mobile device A. The process 600 moves to block 620 where the type of mobile communication device selected from which to restore is compared with the device type of mobile device A. Preferably, the mobile device type is included as part of the unique identification information used to associate backup data with the mobile communication device from which the backup data was copied. In addition, the data management application 52 may interrogate mobile device A to determine the device type of mobile device A. As such, the data management application 52 can compare the mobile device types. If the two mobile devices are of the same type (e.g., both iPhones), the process 600 moves to block 622.

In block 622, the available memory of mobile device A is compared with the amount of memory occupied by the selected backup. If the amount of available memory on mobile device A is greater than the amount of memory occupied by the selected backup, the process 600 moves to block 624, where a full restore is performed. The full restore performed in block 624 includes transferring all of the data items (i.e., personal data as well as configuration and setting data items) associated with the selected backup from the device 10 to mobile device A.

Returning to block 622, if the amount of available memory on mobile device A is less than the amount of memory occupied by the selected backup, the process 600 moves to block 626, where a partial restore is performed. The partial restore performed in block 626 may include transferring a subset of the data items associated with the selected backup from the device 10 to mobile device A. The subset may include some of the personal data and all of the configuration and setting data, or may include none of the configuration and setting data and all or most of the personal data, or any combination of subsets of personal data and subsets of configuration and setting data.

Returning to block 620, if the two mobile devices are different types (e.g., one is a Nexus and the other is an iPhone), the process 600 moves block 628. The functions performed in block 628 are similar to the functions performed in block 622 (i.e., the available memory of mobile device A is compared with the amount of memory occupied by the selected backup). If the amount of available memory on mobile device A is greater than the amount of memory occupied by the selected backup, the process 600 moves to block 630, where a partial restore is performed. The partial restore performed in block 630 includes transferring all of the data items, with the exception of mobile device specific data items, associated with the selected backup from the device 10 to mobile device A. In this way, operating system specific data items are not transferred to mobile devices running different operating systems. For example, Android OS specific data items are not transferred to mobile devices running iOS, and vice versa.

Returning to block 628, if the amount of available memory on mobile device A is less than the amount of memory occupied by the selected backup, the process 600 moves to block 632, where a partial restore is performed. The partial restore performed in block 632 differs from the partial restores performed in blocks 626 and 630, in that the partial restore performed in block 632 includes transferring only a subset of the personal data associated with the selected backup from the device 10 to mobile device A.

In order to further illustrate the functionality of blocks 622-632, non-limiting examples of differing memories are provided. For example, if the selected backup occupies 58 GB of memory and mobile device A has 61 GB of memory available, the process 600 moves from block 622 to block 624 (or from block 628 to block 630). Whereas if the selected backup occupies 63 GB of memory and mobile device A has 61 GB of memory available, the process 600 moves from block 622 to block 626 (or from block 628 to block 632).

Note that the user of mobile device A may control, via the data management application 52, which of the data items are to be transferred to mobile device A during the execution of blocks 624, 626, 630 and 632. For example, even if mobile device A has enough available memory to perform the restores executed in blocks 624 or 630, the user of mobile device A may wish to only restore a subset of the personal data items (e.g., pictures and videos, but not music), and may indicate that preference via the data management application 52.

Note that in order to perform the data transferring functionality resultant from the restore executed in blocks 624, 626, 630 and 632, the user of mobile device A is required to enter the password associated with the selected backup. In addition, since the backup data on the storage element 38 is stored in a protected format that includes encryption of the data copied from the backed up mobile communication device, execution of the restore in blocks 624, 626, 630 and 632 preferably includes data decryption, in order to place the restored data in a format readable by mobile device A.

Also, note that upon completion of the restore executed in blocks 624, 626, 630 and 632, the process 600 may optionally move to block 612a, in which mobile device A is subsequently configured for backup.

Returning now to block 610, the process 600 may also move to block 612c in which the third configuration type is selected. The third configuration type is configuration for recharging only, in which the device 10 does not perform data backup when connected to mobile device A. If the user selects the third configuration type, the unique identifier of mobile device A is logged by the data management application 52 and flagged with an instruction not to perform data backup functionality upon subsequent interfaces between the device 10 and mobile device A.

Figure 6C:
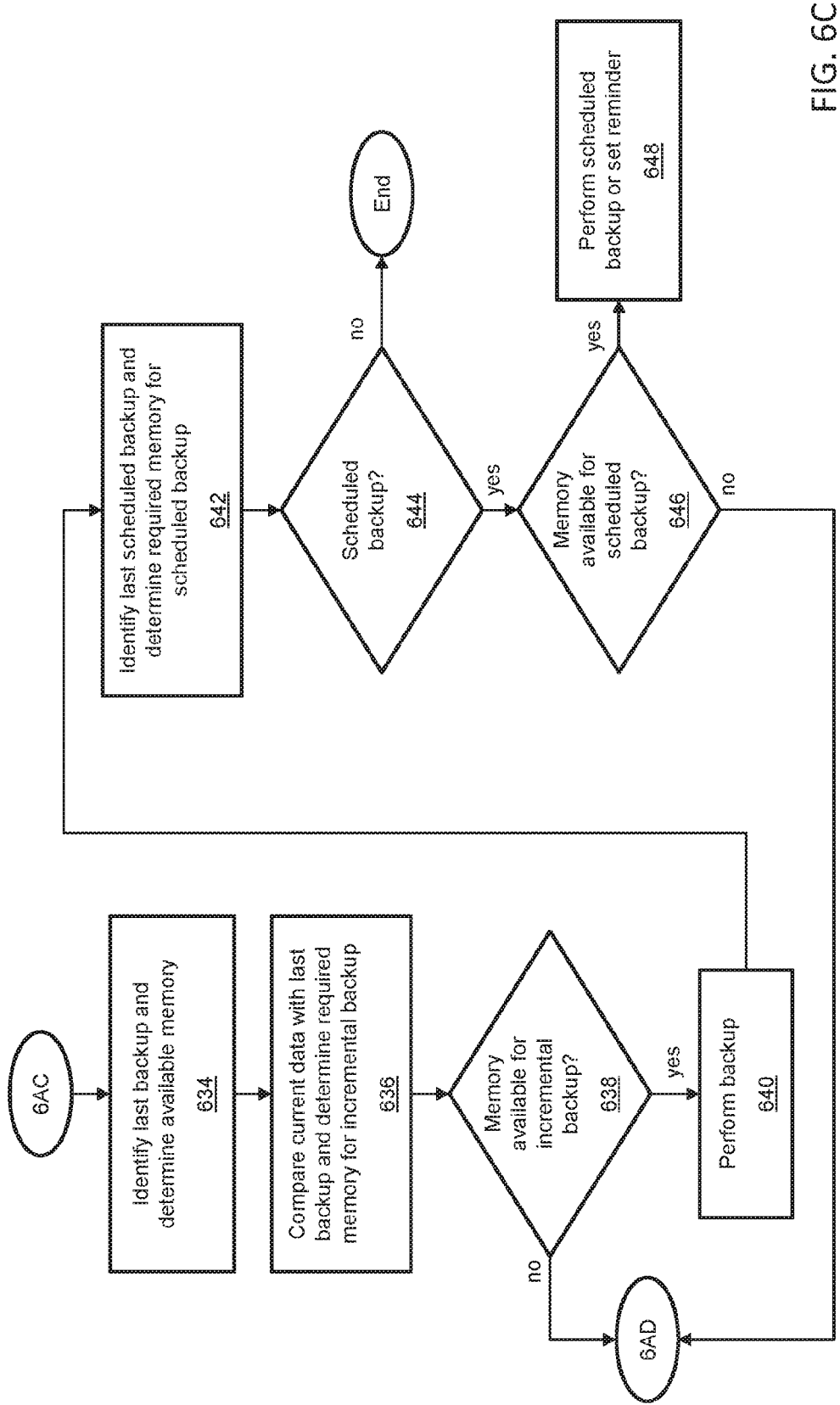

Returning now to block 608, and with reference to FIG. 6C, the process 600 may move to block 634 if mobile device A is recognized by the data management application 52. In block 634, the data management application 52 interrogates the device 10 to determine the amount of available memory on the storage element 38, and to identify the block(s) of data stored on the storage element 38 corresponding to the last backup (of any kind) of mobile device A. As discussed above, the block(s) of data on the storage element 38 are assigned a unique identifier associating the stored data with the device from which the stored data was copied (e.g., mobile device A). In this way, the data management application 52 is able to identify the block(s) of data corresponding to the last backup.

The process 600 then moves to block 636 where the data management application 52 compares the data items stored on mobile device A with the block(s) of data identified in block 634 to identify differences between the data stored on mobile device A and the storage element 38. In other words, the result of the execution of block 636 is the identification of data items stored on mobile device A and not stored on the storage element 38. Based on this identification, the data management application 52 determines the amount of memory required to perform an incremental backup.

The process 600 then moves to block 638, where the available memory on the storage element 38 is compared with the memory required to perform an incremental backup determined in block 638. If the storage element 38 has enough available memory to accommodate the incremental backup, the process 600 moves to block 640 where the incremental backup is performed. If the storage element 38 does not have enough available memory to accommodate the incremental backup, the process 600 moves to block 650 (FIG. 6D), as will be discussed in further detail below.

Subsequent to block 640, the process 600 moves to block 642, where the data management application 52 identifies the last scheduled backup and determines the amount of memory required to perform a scheduled backup. The process 600 then moves to block 644 where the data management application 52 checks whether a scheduled backup is scheduled to occur. If no scheduled backup is scheduled to occur, the process ends and no further data backups are performed. If a scheduled backup is scheduled to occur, the process 600 moves to block 646.

In block 646, the available memory on the storage element 38 is compared with the memory required to perform the scheduled backup as determined in block 642. If the storage element 38 has enough available memory to accommodate the scheduled backup, the process 600 moves to block 648 where the scheduled backup is either performed or an alert or reminder is issued to the user. The alert may be a notification displayed via the data management application 52 alerting the user that a scheduled backup is scheduled to occur and requesting user authorization to perform the scheduled backup. The reminder effectuated via the backup indicator 40c, and may be implemented, for example, via illumination of one or more LEDs of the backup indicator 40c. If the storage element 38 does not have enough available memory to accommodate with the scheduled backup, the process 600 moves to block 650.

Figure 6D:
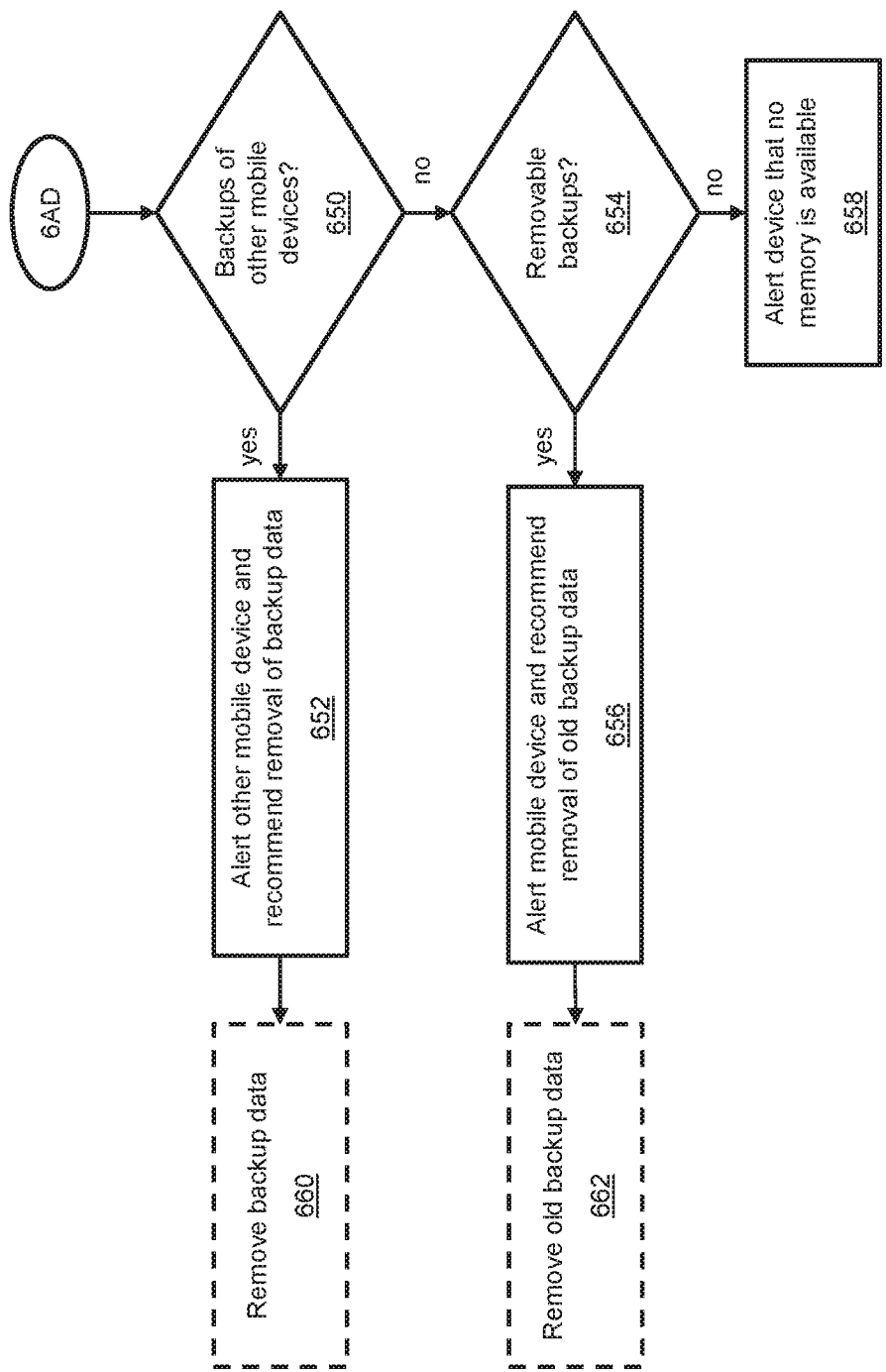

With reference to FIG. 6D and continued reference to FIG. 6C, the process 600 moves to block 650 from blocks 638 or 646 if a determination is made that the storage element 38 does not have enough available memory to accommodate the requested backup. In block 650, the data management application 52 determines whether blocks of backup data associated with mobile devices different from mobile device A are stored on the storage element 38. If such backups are stored on the storage element 38, the process 600 moves to block 652 where the data management application 52 provides a recommendation to the user of mobile device A to remove some or all of those backups from the storage element 38, to allow the device 10 to perform the requested backup for mobile device A. The data management application 52 may also alert the users of the mobile devices different from mobile device A, via SMS or other network based messaging service, of the memory availability issue.

The process 600 may then optionally move to block 660 where removal of some or all of those backups, as determined in block 650, is executed in response to a command issued by the user of mobile device A. Note that in order for the user of mobile device A to provide a command to remove a backup associated with another mobile device, the user of mobile device A is required to enter the password assigned to that backup. If the user of mobile device A successfully removes a backup associated with another mobile device to create enough available memory for accommodating the requested backup for mobile device A, the process 600 may return (not shown) to block 640 or block 648 from block 660.

Returning to block 650, if no backups of other mobile communication devices are stored on the storage element 38, the process 600 moves to block 654 where the data management application 52 determines whether there are any backups associated with mobile device A which can be removed. The criteria for removability may be based on the number and/or age of the backups. For example, if the data management application 52 identifies 10 backups (full or partial backups) spanning a period of two years, the data management application 52 may provide a recommendation to the user to remove the backups that are older than one year.

If the data management application 52 determines there is/are backup(s) which can be removed, the process 600 moves to block 656 where the data management application 52 provides a recommendation to the user of mobile device A to remove some or all of those backups from the storage element 38. The process 600 may then optionally move to block 662 where removal of some or all of those backups, as determined in block 654, is executed in response to a command issued by the user of mobile device A The user may then remove any or all of those backups, by providing the appropriate password associated with the backups of mobile device A. If the user of mobile device A removes enough backups determined by the data management application 52 to removable, and creates enough available memory to accommodate the initially requested backup, the process 600 may return (not shown) to block 640 or block 648 from block 662.

Returning to block 654, if the data management application 52 does not identify any backup(s) deemed to be removable, or does not identify enough removable backups to avail enough memory to accommodate the initially requested backup, the process moves to block 658. In block 658, the data management application 52 notifies the user of mobile device A that there is not enough available memory on the device 10, and may provide a recommendation to the user to acquire a new device (operative in accordance with the description of the device 10) with a larger data storage capacity.

As should be noted from the above description, the process 600 allows for automatic backup of data, from mobile device A to the device 10, if the device 10 has been properly configured by the user to operate with mobile device A, and if sufficient memory is available on the storage element 38 to accommodate the data backup.

Note that each mobile communication device, for example mobile device A, is operative to interface with multiple backup and charging devices, each such backup and charging device being operative in accordance with the description of the device 10. For example, mobile device A may be configured to operate with three backup and charging devices (device 1, device 2, and device 3), such that mobile device A is separately and simultaneously paired with device 1, device 2, and device 3. Execution of the data management application 52 on mobile device A provides the user of mobile device A with a listing of the three devices to which mobile device A is paired. This listing also preferably includes the configuration type 612a-612c (i.e., configuration for backup, restore, or charging only) for each of the devices 1, 2 and 3. For example, devices 1 and 3 may be configured to operate with mobile device A under configuration for backup (i.e., block 612a), while device 2 may be configured to operate with mobile device under configuration for no backup (i.e., block 612c).

The user may also change the configuration type for each of the devices 1, 2 and 3, provided that the user supplies the correct password.

As should be apparent, the execution and configuration of the data management application 52 may be performed when mobile device A is decoupled from any other peripheral device in order to provide seamless configuration management of the devices operative in accordance with the description of the device 10. Furthermore, configuration of the data management application 52 may also be performed via a standard personal computer, such as a desktop or laptop. The data management application 52 may also be used to locate the device 10, based on information received from the locator module 42.

The data backup application 52 is preferably configured to synchronize with designated remote data backup repositories, such as cloud based data repositories. For example, the user of a mobile communication device may provide the data management application 52 with cloud account information to facilitate data synchronization to ensure that the data stored on the cloud associated with the mobile communication device is synchronized with the data stored in the storage element 38 of the device 10.

Although the data backup and charging device as described thus far has pertained to a preferred embodiment of data backup and charging performed via a wired connection between the device and a mobile communication device, other embodiments are possible in which data backup and/or charging are performed wirelessly. For example, as shown in FIG. 4, the electronics 30 may further include a wireless data module 44 coupled to the storage element 38 for facilitating wireless data backup functionality, and/or a wireless charging module 46 for facilitating wireless charging functionality.

The wireless data module 44 receives data for back up from a corresponding wireless module deployed in the mobile communication device. The wireless data module 44 may utilize any standard wireless protocol, including, but not limited to, the "Bluetooth" protocol and the "Wi-Fi" protocol. The wireless data module 44 is preferably coupled to the power controller 34, and may receive operational power from the AC to DC converter 32, which may be provided directly to the wireless data module 44 by the AC to DC converter 32 or indirectly via the power controller 34. Alternatively, the wireless data module 44 may receive operational power from the rechargeable power supply 36, which may be provided directly to the wireless data module 44 by the rechargeable power supply 36 or indirectly via the power controller 34. If present, the locator module 42 may use the wireless data module 44 to emit the location information bearing signal.

The wireless charging module 46 is preferably coupled to the power controller 34 in order to provide charge sourced from the rechargeable power supply 36 or the AC input interface 16. The wireless charging module 46 may be implemented as an inductive charging module and utilize any inductive charging standard, such as, for example, the Qi standard. As is known in the art, inductive charging arrangements provide energy transfer through an inductive coupling to electrical devices.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. As discussed above, the data management application 52 may be implemented as a plurality of software instructions or computer readable program code executed on one or more processors of a mobile communication device. As such, in an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The flowchart and block diagrams in the Drawings illustrate the architecture, functionality, and operation of possible implementations of systems, devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A device for interfacing with a mobile communication device, the mobile communication device including a processor and a storage medium having data retained thereon, the device comprising:
    a single device body;
    electronic circuitry fully integrated within the device body including at least one data storage element and at least one rechargeable power supply;
    an alternating current (AC) power plug having prongs integrated on a surface of the device body, the AC power plug for receiving AC voltage from a mains power supply, the AC power plug operatively coupled to the at least one rechargeable power supply; and
    an interface having at least one portion integrated within a footprint of the device body, the interface operative to detachably and electronically couple the mobile communication device to the at least one storage element and the AC power plug, and to provide direct current (DC) voltage, converted from the received AC voltage, to the mobile communication device,
    the device being configured as a slave device in which the at least one data storage element is operative to receive data transfer commands issued by the processor as input directly from the processor, the data transfer commands being initiated by a user of the mobile communication device and provided to the processor via a data management application executed on the mobile communication device, and the at least one data storage element being operative to receive a copy of a subset of the data retained on the storage medium in response to at least one of the received commands issued by the processor when the mobile communication device is electronically coupled to the interface, the received copied subset of data being stored, in a protected format having at least one layer of protection, in the at least one storage element, the stored subset of data having an assigned unique identifier associating the stored subset of data with the mobile communication device.

2. The device of claim 1, wherein the at least one layer of protection includes encrypting at least a portion of the stored subset of data.

3. The device of claim 1, wherein the at least one layer of protection includes assigning a unique password to the stored subset of data.

4. The device of claim 1, wherein the data management application is installed on the mobile device prior to a first electronic coupling of the mobile communication device to the interface.

5. The device of claim 1, wherein the storing of the subset of data defines a storage event associating the device and the mobile communication device, and wherein, in response to electronic coupling of the mobile communication device to the interface prior to the occurrence of any storage events, the copied subset of the data includes substantially the entirety of the data retained on the storage medium, and the unique identifier is assigned based on an identification number of the mobile communication device.

6. The device of claim 5, wherein, in response to electronic coupling of the mobile communication device to the interface subsequent to the occurrence of at least one storage event, the copied subset of the data includes a subset of the data retained on the storage medium not stored on the at least one data storage element as a result of a preceding electronic coupling of the mobile communication device to the interface.

7. The device of claim 1, wherein, in response to a command issued by a second mobile communication device electronically coupled to the interface, the stored subset of data of the mobile communication device is copied to a storage medium of the second mobile communication device.

8. The device of claim 1, wherein the prongs of the AC power plug are deployed in a fixed extending position away from the surface of the device body.

9. The device of claim 1, wherein
    the interface is switchably coupled to the AC power plug and the at least one rechargeable power supply.

10. The device of claim 1, wherein the at least one rechargeable power supply is operative to receive DC voltage converted from the received AC voltage, and to provide DC voltage to the interface.

11. The device of claim 1, wherein the electronic circuitry includes a power controller electronically coupled to the rechargeable power supply, the AC power plug, and the interface, the power controller operative to switch between a first state, in which DC voltage converted from the received AC voltage is provided to at least one of the interface and the rechargeable power supply, and a second state, in which DC voltage stored in the rechargeable power supply is provided to the interface.

12. The device of claim 1, wherein the at least one data storage element receives operational power from at least one power source selected from the group consisting of: the mobile communication device, the rechargeable power supply, and AC voltage received via the AC power plug.

13. The device of claim 1, further comprising:
    at least one status indicator formed on a surface of the device body, the at least one status indicator providing an indication of at least one of: a charge status of the rechargeable power supply, a backup status of the subset of the data copied to the at least one storage element, and a charge status of a rechargeable power supply of the mobile communication device.

14. The device of claim 1, wherein the interface includes a female universal serial bus (USB) interface having a portion thereof exposed on a surface of the device body, the female USB interface for receiving a male USB connector.

15. The device of claim 1, wherein the device body includes a length dimension, a width dimension, and a thickness dimension, and wherein the surface of the device body on which the prongs of the AC power plug are integrated is a first surface of the device body, the first surface being in a plane defined by the length and width dimensions, and wherein the footprint of the device body is formed on a second surface of the device body oppositely disposed from the first surface.

16. The device of claim 1, wherein the electronic circuitry lacks a processor.

17. A data backup system comprising:
a slave device for interfacing with a mobile communication device including a processor and a storage medium having data stored thereon, the slave device comprising:
  a single device body;
  electronic circuitry fully integrated within the device body including at least one rechargeable power supply and at least one storage element operative to receive user initiated data transfer commands issued by the processor as input directly from the processor,
  an alternating current (AC) power plug having prongs integrated on a surface of the device body to receive AC voltage from a mains power supply and operatively coupled to the at least one rechargeable power supply, and
  a mobile communication device interface integrated within the device body to provide a data link between the at least one storage element and the mobile communication device, and to provide direct current (DC) voltage, converted from the received AC voltage, to the mobile communication device; and
a data management application executable on the mobile communication device upon establishing the data link between the at least one storage element and the mobile communication device, the data management application providing an interface to backup a subset of the data of the storage medium on the at least one storage element upon receipt of the user initiated commands issued by the processor of the mobile communication device.

18. The system of claim 17, wherein the data management application is operative to interrogate the at least one rechargeable power supply to determine a charge level of the at least one rechargeable power supply, and to display a notification to couple the AC power plug to the mains power supply based on the determined charge level.

19. A data backup system comprising:
a data management application executable on a plurality of mobile communication devices, each mobile communication device including a processor and a storage medium having data stored thereon; and
a slave device for interfacing with the plurality of mobile communication devices, the slave device comprising:
  electronic circuitry fully integrated within a single device body including a rechargeable power supply and a storage element operative to store data associated with the data stored on the storage medium of each of the mobile communication devices, and operative to transfer data stored on the storage element based on received commands issued by the respective processor of each mobile communication device, the received commands being initiated by a respective user of each mobile communication device and provided to the respective processor via the data management application,
  an alternating current (AC) power plug having prongs integrated on a surface of the device body to receive AC voltage from a mains power supply and operatively coupled to the rechargeable power supply, and
  an interface integrated within the device body to provide a data link between the storage element and each of the mobile communication devices, and to provide direct current (DC) voltage, converted from the received AC voltage, to each of the mobile communication devices,
wherein upon establishing the data link between the storage element and a first mobile communication device of the plurality of mobile communication devices, should the data management application identify that the storage element lacks the storage capacity to store data associated with the data stored on the storage medium of the first mobile communication device, the data management application facilitates removal of a portion of data stored on the storage element based on a command initiated by the user of the first mobile communication device, the portion of data being associated with the data stored on the storage medium of any of the mobile communication devices excluding the first mobile communication device.

* * * * *